United States Patent
Liu et al.

(10) Patent No.: US 9,319,585 B1
(45) Date of Patent: Apr. 19, 2016

(54) HIGH RESOLUTION ARRAY CAMERA

(71) Applicant: OmniVision Technologies, Inc., Santa Clara, CA (US)

(72) Inventors: Chengming Liu, San Jose, CA (US); Jizhang Shan, Cupertino, CA (US); Guansong Liu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/574,761

(22) Filed: Dec. 18, 2014

(51) Int. Cl.
*H04N 5/232* (2006.01)
*H04N 5/265* (2006.01)
*H04N 9/09* (2006.01)
*H04N 9/07* (2006.01)

(52) U.S. Cl.
CPC ........... *H04N 5/23245* (2013.01); *H04N 5/265* (2013.01); *H04N 9/07* (2013.01); *H04N 9/09* (2013.01)

(58) Field of Classification Search
CPC . H04N 5/23245; H04N 5/265; H04N 5/2628; H04N 9/07; H04N 9/09
USPC .............. 348/262, 239, 218, 236, 222.1, 273
See application file for complete search history.

(56) References Cited

U.S. PATENT DOCUMENTS

| | | | | |
|---|---|---|---|---|
| 4,823,186 A * | 4/1989 | Muramatsu | ............ | H04N 9/045 348/236 |
| 5,694,165 A | 12/1997 | Yamazaki et al. | | |
| 5,852,502 A * | 12/1998 | Beckett | ................ | G11B 27/031 358/512 |
| 5,978,023 A * | 11/1999 | Glenn | .................. | H04N 7/0132 348/273 |
| 6,266,093 B1 * | 7/2001 | Glenn | ....................... | H04N 9/64 348/446 |
| 6,788,338 B1 * | 9/2004 | Dinev | .................. | H04N 5/2258 348/222.1 |
| 7,483,065 B2 * | 1/2009 | Gruhlke | ................. | H04N 9/045 348/222.1 |
| 8,115,825 B2 * | 2/2012 | Culbert | ................ | H04N 5/2253 348/236 |
| 8,681,250 B2 | 3/2014 | Culbert et al. | | |
| 2008/0024390 A1* | 1/2008 | Baker | ................... | G06T 3/4053 348/E5.048 |
| 2012/0026366 A1 | 2/2012 | Golan et al. | | |

* cited by examiner

*Primary Examiner* — Nhan T Tran
(74) *Attorney, Agent, or Firm* — Blakely Sokoloff Taylor & Zafman LLP

(57) ABSTRACT

A method of generating a high resolution color image includes focusing a first image onto a monochrome image sensor having a P resolution and focusing a second image onto a color image sensor having a Q resolution, where Q<P, and where the first image is a same image as the second image. P resolution pixel data representative of the first image from the monochrome image sensor is generated. Q resolution pixel data representative of the second image from the color image sensor is generated. The P resolution pixel data representative of the first image from the monochrome image sensor and the Q resolution pixel data representative of the second image from the color image sensor are combined to generate an R resolution color image, where P<R≤(P+Q).

19 Claims, 6 Drawing Sheets

FIG. 5A  FIG. 5B

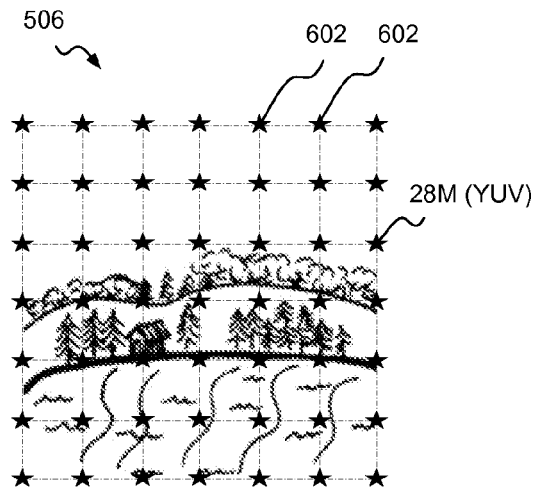 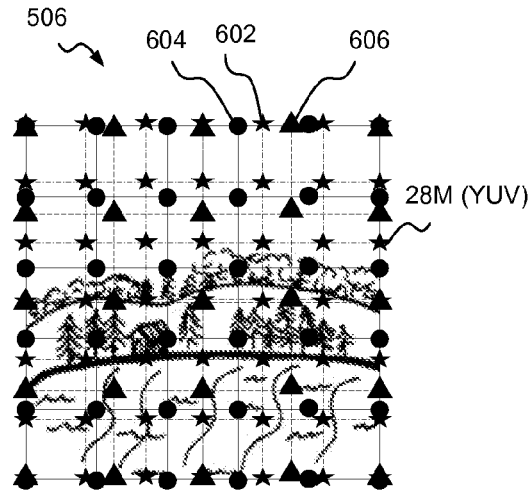
FIG. 6A          FIG. 6B
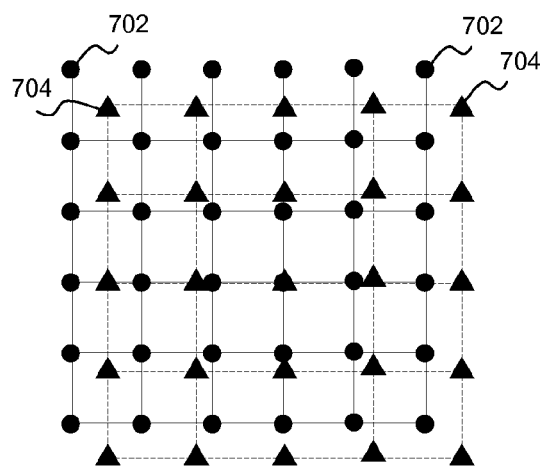
FIG. 7

HIGH RESOLUTION ARRAY CAMERA

BACKGROUND INFORMATION

1. Field of the Disclosure

This invention is related to cameras. In particular, embodiments of the present invention are related high resolution color image cameras.

2. Background

Image sensors are used in a wide range of applications, including for example smart phones, webcams, digital cameras, as well as other industrial and medical applications. As technologies continue to advance, there is an increasing demand for smaller and higher resolution image sensors. For instance, there is an increasing demand for color image sensors having 0.8 µm pixels. However, the manufacturing of 0.8 µm color image sensors is more expensive compared to the manufacturing of 1.12 µm color image sensors. Thus, a less expensive way to produce a color image similar to a color image provided with a 0.8 µm color image sensor is desired.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5A shows an example first image produced by a first image sensor having a first resolution of pixel data of Y information in accordance with the teachings of the present invention.

FIG. 5B shows an example second image produced by a second image sensor having a second resolution of pixel data of YUV information in accordance with the teachings of the present invention.

FIG. 6A shows an example image with uniformly distributed distinct in accordance with the teachings of the present invention.

FIG. 6B shows an example image with re-sampled interpolated pixels in accordance with the teachings of the present invention.

FIG. 7 shows an example in which the first and last pixels of a second image in a first row of an arbitrary unit are shifted from the first and last pixels of a first image in a first row of the arbitrary unit by a half of pixel in both vertical and horizontal directions to form a third image in accordance with the teachings of the present invention.

Figure 1:
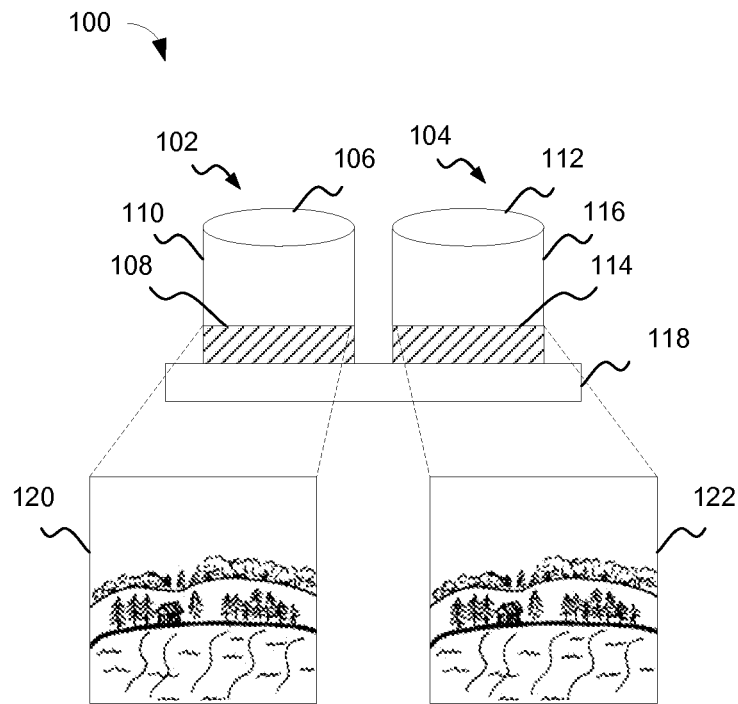
FIG. 1 shows an example of an imaging system that includes two camera modules in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for implementing a high resolution array camera are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, an example array camera in accordance with the teachings of the present invention includes a first camera module and a second camera module. In one example, both camera modules have identical lens systems. In the example, the first camera module includes a monochrome image sensor having a resolution of P, and the second camera module includes a color image sensor having a resolution of Q, where Q<P. In the example, a color image, which has a resolution of R, is produced by combining the monochrome image, which has the resolution of P, and the color image, which has the resolution of Q. In the example, $P<R\leq(P+Q)$.

In the following description, examples are provided for explanation purposes, which include for instance a 0.8 µm color image sensor that corresponds to a 28 megapixel resolution, a 1.12 µm color image sensor that corresponds to a 13 megapixel resolution, and a 0.9 µm monochrome image sensor that corresponds to a 20 megapixel resolution.

In particular, in one example, a color image that is produced by a 1.12 µm color image sensor is combined with a monochrome image that is produced by a 0.9 µm monochrome image sensor to generate a color image that has almost no visual difference as perceived by a viewer compared to an image provided by a 0.8 µm color image sensor in accordance with the teachings of the present invention. In the example, both the 1.12 µm color image sensor and the 0.9 µm monochrome image sensor are less expensive than a 0.8 µm color image sensor. In other words, the combination of both a 1.12 µm color image sensor and a 0.9 µm monochrome image sensor is still less expensive than a 0.8 µm color image sensor. Thus, in one example, an array camera having two camera modules is used. One camera module includes a 1.12 µm color image sensor, and another camera module includes a 0.9 µm monochrome image sensor. In the example, both the 1.12 µm color image sensor and 0.9 µm monochrome image sensor have the same size active areas to detect an image focused onto the camera modules. Accordingly, both the 1.12 µm color image sensor and 0.9 µm monochrome image sensor detect an identical image.

To illustrate, FIG. 1 shows an example of an imaging system 100 of the present invention that includes two camera modules 102 and 104 that are disposed close to each other in accordance with the teachings of the present invention. In the example, camera module 102 includes a lens, or a lens system, 106 that may include one or more lenses (not shown), and an image sensor 108 in a housing 110. Similarly, camera module 104 includes a lens, or a lens system, 112 that may include one or more lenses (not shown), and an image sensor 114 in a housing 116. In one example, lens system 106 and lens system 112 are identical and each include a plurality of lenses. Camera modules 102 and 104 may be disposed on a substrate 118. Image sensors 108 and 114 may be electrically coupled to a processing block including electronic circuits on substrate 118. In one example, an image 120 focused on image sensor 108 by lens system 106 is the same image as an image 122 focused on image sensor 114 by lens system 112. In another example image 120 may be slightly different from image 122.

In the depicted example, the respective active areas of image sensor 108 and image sensor 114 have same size, but have different resolutions or a different number of pixels. For instance, in one example, the resolution of image sensor 108 is P (e.g., P=20 megapixels), and the resolution of image sensor 114 is Q (e.g., Q=13 megapixels), and P is greater than Q (P>Q). In other words, the pixel pitch of image sensor 108 is smaller than the pixel pitch of image sensor 114.

Furthermore, in the depicted example, image sensor 108 is a monochrome image sensor, i.e., there is no color filter, and image sensor 114 is color image sensor. Thus, in the depicted example, color image sensor 114 includes a color filter array such as for example a Bayer color filter array.

Figure 2:
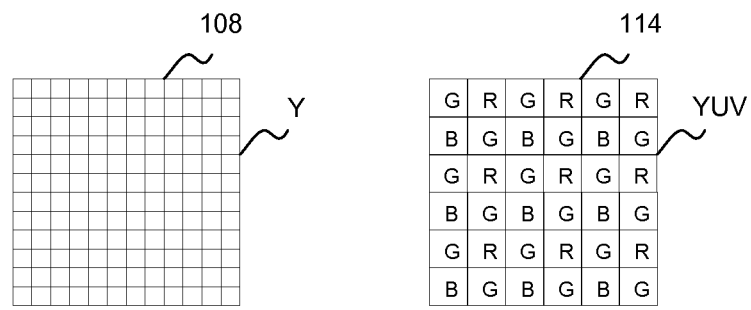
FIG. 2 shows schematically a first image sensor with no color filter array, and second image sensor with color filter array in accordance with the teachings of the present invention.

FIG. 2 shows schematically an image sensor 108, which has no color filter array, and image sensor 114, which has a color filter array, in accordance with the teachings of the present invention. In the example, a Bayer color filter array is illustrated, wherein R represents red color filters, G represents green color filters, and B represents blue color filters of the color filter array. Accordingly, image sensor 108 produces P pixel data including a luminance signal (Y) representative of image 120. Image sensor 114 produces Q pixel data representative of image 122, where each individual pixel data may be a red (R) signal, green (G) signal, or blue (B) signal. After standard demosaicing interpolation, image sensor 114 produces Q pixel data, where each pixel data has an interpolated R signal, G signal, and B signal (RGB). The interpolated Q pixel data may be converted into luminance and chrominance signals (YUV) from the RGB signal. Thus, image sensor 108 produces P pixel data of Y, and image sensor 114 produces Q pixel data of YUV, where Q<P.

In another example, it is appreciated that the P pixel data may be converted into RGB signals, if it is assumed that R=G=B. Thus, in this example, image sensor 108 produces P pixel data of RGB, and image sensor 114 produces Q pixel data of RGB, Q<P.

Figure 3:
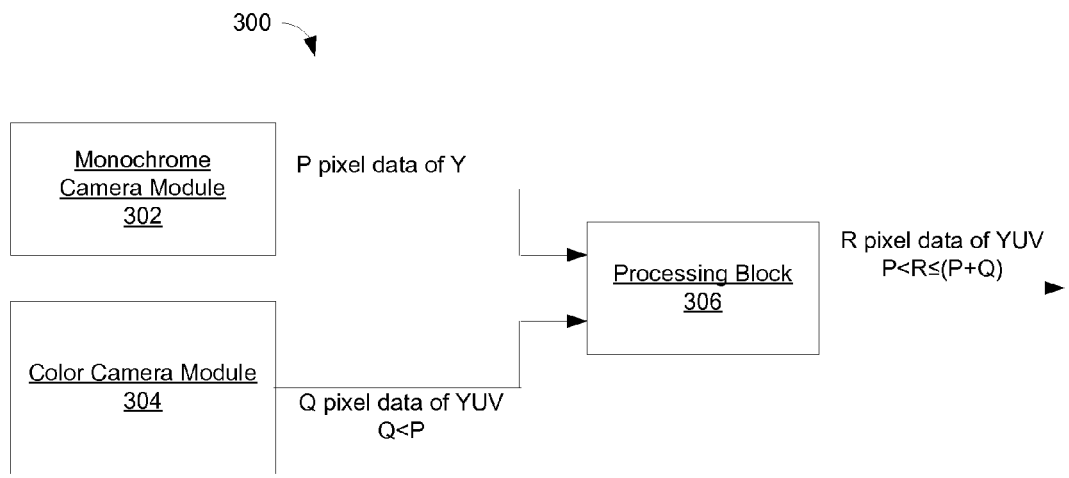
FIG. 3 shows a block diagram of an example imaging system in accordance with the teachings of the present invention.

FIG. 3 shows a block diagram of an example imaging system 300 in accordance with the teachings of the present invention. In the example, a monochrome camera module 302 shows P pixel data of Y information produced by a monochrome image sensor included within monochrome camera module 302, such as for example image sensor 108, and a color camera module 304 shows Q pixel data of YUV information produced by color image sensor included within color camera module 304, such as for example image sensor 114, where Q<P. In the example, data from monochrome camera module 302 and data from color camera module 304 are coupled to be received by a processing block 306, in which the P pixel data from monochrome camera module 302 and the Q pixel data from color camera module 304 are combined resulting in R pixel data of YUV, where P<R≤(P+Q), as shown.

Thus, it is appreciated that a monochrome image sensor included in monochrome camera module 302, having a resolution P, and a color image sensor included in color camera module 304, having a resolution Q, where Q<P, are coupled to be received and utilized by processing block 306 to generate a color output having resolution R, where P<R≤(P+Q), in accordance with the teachings of the present invention.

Figure 4:
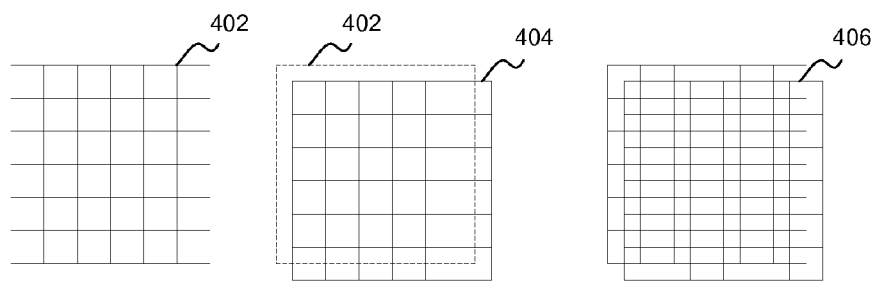
FIG. 4 shows in an example in which two images of the same size are combined in accordance with the teachings of the present invention.

FIG. 4 shows in an example in which two images of the same size may be combined. For example, FIG. 4 illustrates a first image 402 that has P pixel data of Y information, and a second image 404 that also has the same P pixel data of Y information. In the example, second image 404 is shifted from first image 402 by a half of pixel in both vertical and horizontal directions. When first image 402 and second image 404 are combined, it results in a third image 406, which has 2P pixel data of Y information. Similarly, if each of first image 402 and second image 404 has P pixel data of YUV, the resulting third image 406 has 2P pixel data of YUV. In other words, the resolution of the resulting image is doubled. This is because no pixels of first image 402 and second image 404 completely overlap.

If first image 402 has P pixel data, second image 404 has Q pixel data, the resulting third image 406 has R pixel data, where R=P+Q. However, this is only true when P=Q, and second image 404 is shifted from first image 402 by a half of pixel in both vertical and horizontal directions. When P≠Q, some pixels of first image 402 and second image 404 may completely overlap. If a pixel of first image 402 completely overlaps a pixel of second image 404, then the two completely overlapping pixels may be counted as a pixel only. Accordingly, the resulting third image 406 has R pixel data, where R<(P+Q).

To illustrate, image sensor 108 of FIG. 1 is a monochrome image sensor having a first pixel pitch with a resolution substantially equal to 20 megapixels, and image sensor 114 of FIG. 1 is color image sensor having a second pixel pitch with a resolution substantially equal to 13 megapixels. In that example, the active areas of image sensors 108 and 114 are the same. Thus, the first pixel pitch of image sensor 108 is smaller than the second pixel pitch of image sensor 114. Assuming that $\sqrt{20M}:\sqrt{13M} \approx 6:5$, and assuming that $(6 \times 6):(5 \times 5) \approx 20M:13M$, 6×6 pixels of image sensor 108 occupy approximately the same arbitrary unit area as 5×5 pixels of image sensor 114.

Figure 5C:
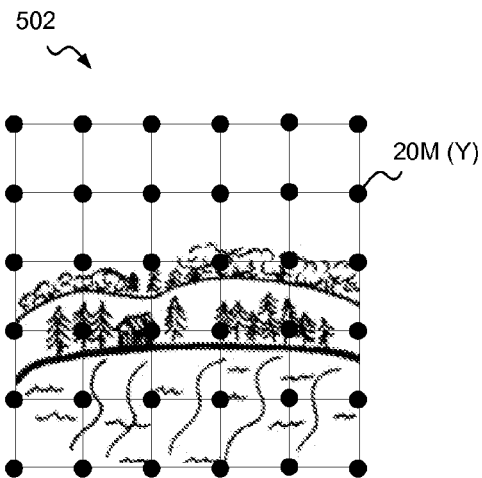
FIG. 5C shows an example in first and second images are combined resulting in third image having a third resolution in accordance with the teachings of the present invention.
Figure 5C:
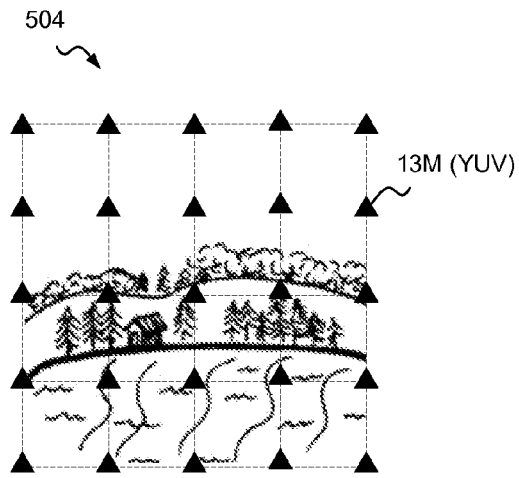
Figure 5C:
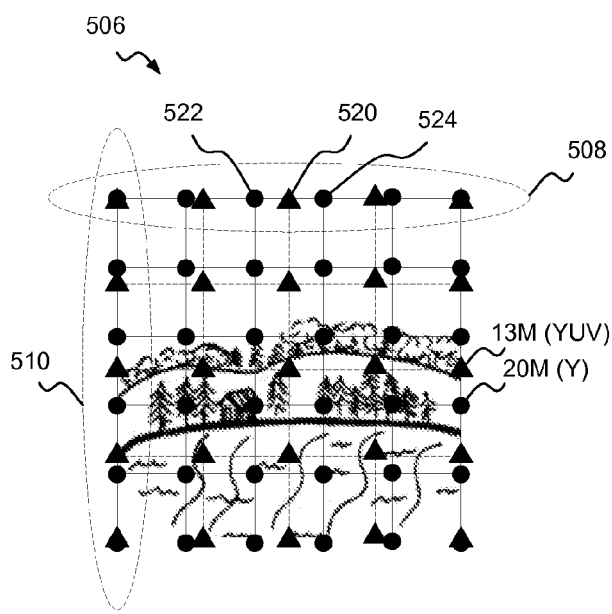

FIG. 5A shows an example image 502 produced by image sensor 108, which has a first pixel pitch with a resolution of 20 megapixels of pixel data of Y information in accordance with the teachings of the present invention. In an arbitrary unit area, there are 6×6 pixels. FIG. 5B shows an example image 504 produced by image sensor 114, which has a second pixel pitch with a resolution of 13 megapixels of pixel data of YUV information in accordance with the teachings of the present invention. In the example, the first pixel pitch of image 502 is smaller than the second pixel pitch of image 504 such that the size of image 502 is the same as the size of image 504, even though image 502 has a resolution of 20 megapixels and image 504 has a resolution of 13 megapixels. In the same arbitrary unit area, there are 5×5 pixels. FIG. 5C shows an example in which image 502 and image 504 are combined by processing block 306, i.e., overlapped, resulting in an image 506 in accordance with the teachings of the present invention.

Referring to a first row 508 of image 506 in the depicted example, the first and last pixels of image 502 and image 504 are completely overlapped. A central pixel 520 of image 504 is centered between two pixels 522 and 524 of image 502. In the example, pixel 520 may be counted as a separate pixel between pixels 522 and 524. In the depicted example, only pixel 520 of image 504 is distinctly separated from the pixels of image 502. Therefore, first row 508 will have 7 distinct pixels in the illustrated example. Similarly, a first column 510 will have 7 distinct pixels. Thus, there will be 7×7 distinct pixels in the arbitrary unit area in the illustrated example. Therefore, assuming that (6×6):(5×5):(7×7)≈20M:13M:28M, the combination of image 502 and image 504 produces image 506 having a resolution substantially equal to 28 megapixels in accordance with the teachings of the present invention.

Accordingly, it is assumed that image 506 has 28 megapixels of Y information, since image 502 has 20 megapixels of Y information and image 504 has 13 megapixels of YUV information. In addition, since the human perception is less sensitive to color information, the chrominance signal (UV) of the 13 megapixels of data of YUV information of image 504 is sufficient to be distributed throughout the 28 megapixels of data of image 506 in accordance with the teachings of the present invention. Accordingly, image 506 will have 28 megapixels of data of YUV in accordance with the teachings of the present invention.

In one example, since the information in the 7×7 distinct pixels in the arbitrary unit area may not be uniformly distributed, the arbitrary unit area of image 506 is re-sampled by processing block 306 to have 7×7 pixels 602, which are uniformly distributed, as shown in the example depicted in FIG. 6A in accordance with the teachings of the present invention. The values of the newly re-sampled 7×7 pixels 602, which are illustrated as stars, may be interpolated by processing block 306 from pixels 604, which are illustrated as dots, of image 502 and pixels 606, which are illustrated as triangles, of image 504 as shown in FIG. 6B in accordance with the teachings of the present invention.

In one example, in order to determine the YUV values of the 7×7 pixels of image 506, the Y values of the 6×6 pixels of image 502 are first converted by processing block 306 into YUV values, with the assumption that B=G=R. Then the YUV values of the 7×7 pixels of image 506 may then be interpolated by processing block 306 in an arbitrary interpolation window from the transformed YUV values of the 6×6 pixels of image 502 and the YUV values of the 5×5 pixels of image 504 in accordance with the teachings of the present invention.

It is appreciated of course that above mentioned numbers are examples that are discussed for explanation purposes, and that other numbers may be utilized in accordance with the teachings of the present invention.

Therefore, in general, a first image has a resolution of P pixels of data of Y information (i.e., monochrome) and a second image has a resolution of Q pixels of data of YUV information (i.e., color), where Q<P. In the example, the pixel pitch of the first image is smaller than the pixel pitch of the second image. However, the area sizes of the first and second images are the same. For instance, the first image is represented by a unit area having m×m pixels. The second image is represented by the same unit area having n×n data pixels, where n<m. The unit areas of the first and second images are overlapped. The first and last pixels of the first row of the unit areas of the first and second images are completely overlapped. The number of pixels in the first row, which are distinctly separated, is estimated, which may be k, where k>m>n.

A third image, which is generated by the processing block by combining the first and second images, is represented by the same unit area size having k×k pixels. The Y values of the first image are converted into the YUV values, assuming that R=G=B. The YUV values of the k×k pixels of the third image are interpolated in an arbitrary interpolation window from the transformed YUV values of the first image and the YUV values of the second image. The k×k pixels represent an image having R pixels of data of YUV information. The third image has R pixels of data of YUV information, where P<R≤(P+Q). In another example, RGB values may be used instead of YUV values.

FIG. 7 shows an example where the first and last pixels 704 of the second image 504 in the first row of an arbitrary unit are shifted from the first and last pixels 702 of the first image 502 in the first row of the arbitrary unit by a half of pixel in both vertical and horizontal directions to form a third image in accordance with the teachings of the present invention. As shown in the example, a unit area of the third image may have l×l pixels, where l>k. Thus the third image, which is formed by combining the first and second images may have R' pixels data of YUV information, where R'>R. In another example, the pixels 704 of the second image 504 may be shifted from the pixels 702 of the first image 502 by a fraction of pixel other than a half.

Figure 8:
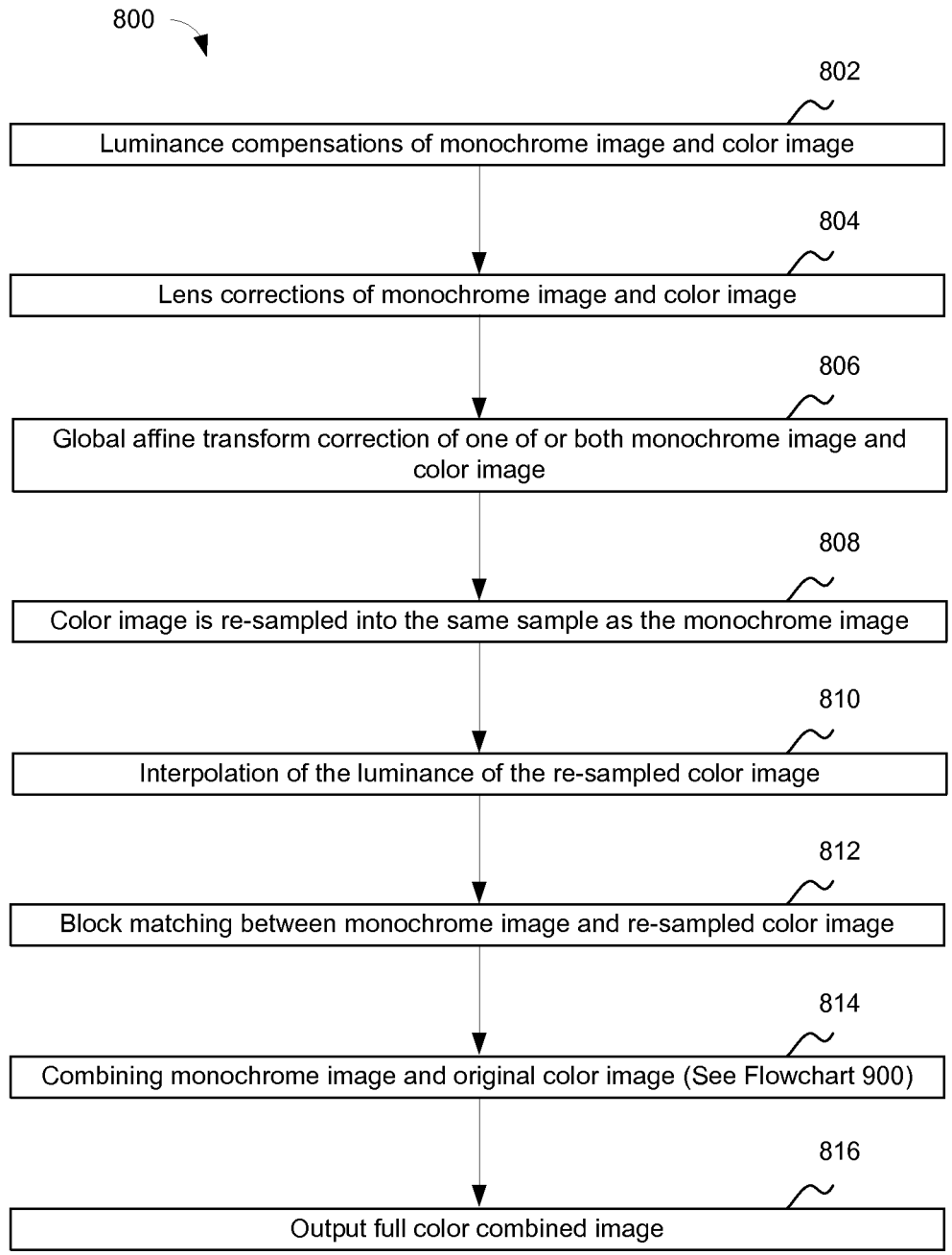
FIG. 8 shows a flowchart of an example process for combining color and monochrome images, where the color image has a lower resolution as compared with the monochrome image in accordance with the teachings of the present invention.

FIG. 8 shows a flowchart 800 of an example process that may be performed by processing block 306 for combining a monochrome image and a color image, where the color image has a lower resolution as compared with the monochrome image in accordance with the teachings of the present invention.

In process block 802, the luminance values of the monochrome image and the color image are compensated. For instance, in one example, the global average luminance values of both images are normalized to be the same. In process block 804, the effects of lens distortion on both images are corrected. In process block 806, an image of two images or of both images are corrected using a global affine transform. In one example, the global affine transform includes a shift, rotation, and scale transformation, which results in the monochrome and color images having correct alignment in shift, rotation, and scale. In process block 808, the color image is re-sampled into the same sample as the monochrome image. In process block 810, the luminance value of the new sample points of the color image are interpolated from the luminance values of the original sample points of the color image. In process block 812, the blocks of the two images that have the same sample points are matched. In process block 814, the two images are combined resulting in a color output image. In process block 816, the combined color image is outputted.

Figure 9:
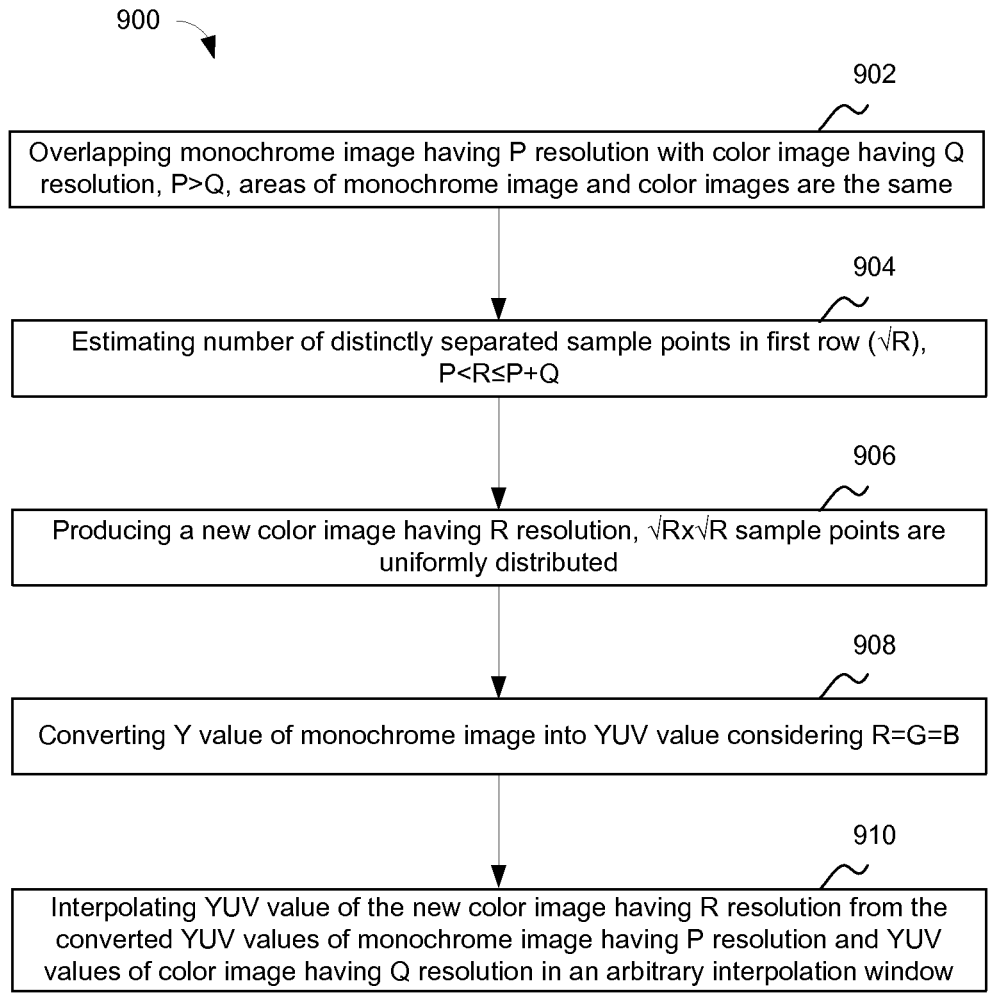
FIG. 9 is an illustration of an example flowchart that shows further detail of example of processing that may be performed to combine a monochrome and color image in accordance with the teachings of the present invention.

FIG. 9 is an illustration of an example flowchart that gives one example of processing that may be performed by processing block 306 to realize process block 814 in accordance with the teachings of the present invention. In process block 902, the original monochrome image having P resolution ($\sqrt{P} \times \sqrt{P}$ pixels) is overlapped with the original color image having Q resolution ($\sqrt{Q} \times \sqrt{Q}$ pixels), where P>Q. The size areas of the monochrome image and the color image are the same. In one example, the first sample point of the first row of the monochrome image is completely overlapped with the first sample point of first row of the color image. In process block 904, the number of distinctly separated sample points in the first row of the overlapped image is estimated, which for example is equal to $\sqrt{R}$, where P<R≤(P+Q). In process block 906, a new color image is produced. In the example, the new color image has a resolution equal to R, where the ($\sqrt{R} \times \sqrt{R}$) sample points are uniformly distributed. In process block 908, the Y information of the monochrome image is converted into YUV information, assuming that R=G=B. In process block 910, the YUV information at the sample point of the new color image is interpolated from the YUV values of the pixels of the monochrome image having P resolution and the YUV values of the pixels of the color image having Q resolution in an arbitrary interpolation window.

In one example, a monochrome image having a resolution of P=20 megapixels is produced by a 0.9 µm monochrome image sensor, and a color image having a resolution of Q=13 megapixels is produced by a 1.12 µm color image sensor. In the example, the resulting color image has a resolution of R=28 megapixels, which is the same resolution as a color image produced by a more expensive 0.8 µm color image sensor in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of generating a high resolution color image, comprising:
   focusing a first image onto a monochrome image sensor having a P resolution;
   focusing a second image onto a color image sensor having a Q resolution, wherein Q<P, and wherein the first image is a same image as the second image;
   generating P resolution pixel data representative of the first image from the monochrome image sensor;
   generating Q resolution pixel data representative of the second image from the color image sensor; and
   combining the P resolution pixel data representative of the first image from the monochrome image sensor and the Q resolution pixel data representative of the second image from the color image sensor to generate an R resolution color image, wherein P<R≤(P+Q).

2. The method of claim 1 wherein the first image is focused onto the monochrome image sensor with a first lens system, wherein the second image is focused onto the color image sensor with a second lens system, wherein the second lens system is identical to the first lens system.

3. The method of claim 1 wherein combining the P resolution pixel data representative of the first image from the monochrome image sensor and the Q resolution pixel data representative of the second image from the color image sensor comprises estimating a number of distinctly separated sample points of a first row of the P resolution pixel data from the monochrome image sensor overlapped with a first row of the Q resolution pixel data from the color image sensor to be equal to $\sqrt{R}$, wherein a first sample point of the first row of the P resolution pixel data from the monochrome image sensor is completely overlapped with a first sample point of the first row of the Q resolution pixel data from the color image sensor.

4. The method of claim 1 wherein the P resolution pixel data from the monochrome image sensor has a first pixel pitch, wherein the Q resolution pixel data from the color image sensor has a second pixel pitch, wherein the first pixel pitch is smaller than the second pixel pitch, and wherein a size of a monochrome image produced by the monochrome image sensor is a same size as a color image produced by the color image sensor.

5. The method of claim 1 wherein combining the P resolution pixel data representative of the first image from the monochrome image sensor and the Q resolution pixel data representative of the second image from the color image sensor comprises uniformly distributing $\sqrt{R} \times \sqrt{R}$ pixels in the R resolution color image.

6. The method of claim 5 wherein combining the P resolution pixel data representative of the first image from the monochrome image sensor and the Q resolution pixel data representative of the second image from the color image sensor further comprises interpolating in an arbitrary interpolation window a YUV value of a pixel of the $\sqrt{R} \times \sqrt{R}$ pixels of the R resolution color image from YUV values of pixels of a monochrome image produced by the monochrome image sensor and from YUV values of pixels of a color image produced by the color image sensor.

7. The method of claim 6 wherein combining the P resolution pixel data representative of the first image from the monochrome image sensor and the Q resolution pixel data representative of the second image from the color image sensor further comprises converting the YUV values of pixels of the monochrome image produced by the monochrome image sensor from Y values of pixels of the monochrome image produced by the monochrome image sensor considering R=G=B.

8. The method of claim 6 wherein combining the P resolution pixel data representative of the first image from the monochrome image sensor and the Q resolution pixel data representative of the second image from the color image sensor further comprises converting the YUV values of pixels of the color image produced by the color image sensor from RGB values of pixels of the color image produced by the color image sensor.

9. The method of claim 1 wherein the P resolution of the monochrome image sensor is substantially equal to 20 megapixels, wherein the Q resolution of the color image sensor is substantially equal to 13 megapixels, and wherein the R resolution of the color image generated by combining the P resolution pixel data representative of the first image from the monochrome image sensor and the Q resolution pixel data representative of the second image from the color image sensor is substantially equal to 28 megapixels.

10. The method of claim 9 wherein the monochrome image sensor comprises a 0.9 μm monochrome image sensor, wherein the color image sensor comprises a 1.12 μm color image sensor, and wherein the R resolution of the color image corresponds to a 0.8 μm color image sensor.

11. An array camera, comprising:
a first camera module including:
  a first lens system;
  a monochrome image sensor having a P resolution, wherein the first lens system is optically coupled to focus a first image onto the monochrome image sensor;
a second camera module including:
  a second lens system, wherein the second lens system is identical to the first lens system;
  a color image sensor having a Q resolution, wherein Q<P, wherein the second lens system is optically coupled to focus a second image onto the color image sensor, where the first image is a same image as the second image; and
a processing block coupled to receive P resolution pixel data from the first camera module representative of the first image and Q resolution pixel data from the second camera module representative of the second image, wherein the processing block is coupled to combine the P resolution pixel data from the first camera module and the Q resolution pixel data from the second camera module to generate an R resolution color image, wherein $P<R\leq(P+Q)$.

12. The array camera of claim 11 wherein the processing block is coupled to estimate a number of distinctly separated sample points of a first row of the P resolution pixel data from the first camera module overlapped with a first row of the Q resolution pixel data from the second camera module to be equal to $\sqrt{R}$, wherein a first sample point of the first row of the P resolution pixel data from the first camera module is completely overlapped with a first sample point of the first row of the Q resolution pixel data from the second camera module.

13. The array camera of claim 11 wherein the P resolution pixel data from the first camera module has a first pixel pitch, wherein the Q resolution pixel data from the second camera module has a second pixel pitch, wherein the first pixel pitch is smaller than the second pixel pitch, and wherein a size of a monochrome image produced by the first camera module is a same size as a color image produced by the second camera module.

14. The array camera of claim 11 wherein the processing block is coupled to generate the R resolution color image with $\sqrt{R}\times\sqrt{R}$ pixels uniformly distributed.

15. The array camera of claim 14 wherein the processing block is coupled to interpolate in an arbitrary interpolation window a YUV value of a pixel of the $\sqrt{R}\times\sqrt{R}$ pixels of the R resolution color image from YUV values of pixels of a monochrome image produced by the first camera module and from YUV values of pixels of a color image produced by the second camera module.

16. The array camera of claim 15 wherein the processing block is coupled to convert the YUV values of pixels of the monochrome image produced by the first camera module from Y values of pixels of the monochrome image produced by the first camera module considering R=G=B.

17. The array camera of claim 15 wherein the processing block is coupled to convert the YUV values of pixels of the color image produced by the second camera module from RGB values of pixels of the color image produced by the second image sensor.

18. The array camera of claim 11 wherein the P resolution of the monochrome image sensor is substantially equal to 20 megapixels, wherein the Q resolution of the color image sensor is substantially equal to 13 megapixels, and wherein the R resolution of the color image generated by the processing block is substantially equal to 28 megapixels.

19. The array camera of claim 18 wherein the monochrome image sensor comprises a 0.9 μm monochrome image sensor, wherein the color image sensor comprises a 1.12 μm color image sensor, and wherein the color image generated by the processing block having the R resolution substantially equal to 28 megapixels corresponds to a 0.8 μm color image sensor.

* * * * *